United States Patent [19]
Payne

[11] Patent Number: 4,541,513
[45] Date of Patent: Sep. 17, 1985

[54] FLUID POWER TRANSMISSION

[76] Inventor: William H. Payne, 111 Pratt St., Madison, N.C. 27025

[21] Appl. No.: 529,843

[22] Filed: Sep. 6, 1983

[51] Int. Cl.⁴ .............................................. F16D 31/00
[52] U.S. Cl. .............................. 192/58 R; 192/103 F; 192/104 F; 192/105 F; 192/103 FA; 464/1; 464/27
[58] Field of Search ...................... 464/24, 25, 27, 1, 3, 464/35; 192/58 R, 105 F, 103 F, 103 FA, 104 F

[56] References Cited
U.S. PATENT DOCUMENTS

| | | | |
|---|---|---|---|
| 2,903,083 | 9/1959 | Kelley | 192/103 FA |
| 2,964,959 | 12/1960 | Beck et al. | 192/103 FA |
| 3,958,419 | 5/1976 | Laing | 60/397 |
| 4,214,652 | 7/1980 | Queenville | 192/58 R |
| 4,318,311 | 3/1982 | Ross | 192/103 FA |

Primary Examiner—Edward G. Favors
Attorney, Agent, or Firm—Shefte, Pinckney & Sawyer

[57] ABSTRACT

A fluid power transmission adapted for combination with an engine to drive auxiliary equipment thereto including a rotor arrangement for direct driving connection to the engine crankshaft and a housing assembly rotatably supported on the rotor arrangement and forming therewith a fluid drive circuit to be in driven relation therewith. A centrifugally-actuated valve is radially disposed in the fluid circuit in the housing assembly to remain closed at rotational speeds of the housing assembly less than a predetermined optimum speed and to yield in response to centrifugal forces created upon rotation of the housing assembly at greater speeds for fluid flow in the fluid circuit to create slippage of the housing assembly about the rotor arrangement to limit increases in the rotational speed of the housing assembly over the optimum speed. The housing assembly includes a pulley wheel by which the auxiliary units are driven generally constantly at the optimum speed for maximum efficiency.

29 Claims, 7 Drawing Figures

FLUID POWER TRANSMISSION

BACKGROUND OF THE INVENTION

In conventional automobiles, trucks and like motor vehicles, a wide variety of accessory equipment is typically provided, including for example power-assisted steering and braking units, air conditioning units, engine cooling arrangements, and electrical generators or alternators for providing power for various electrically-operated equipment. The driving members for these various accessories are conventionally driven rotatably directly from the crankshaft of the vehicle engine. Accordingly, the driving members are subject to a widely varying rotational driving input speed during the course of the ordinary operation of the vehicle, the rotary input speed from the crankshaft typically varying several thousand revolutions per minute. Because ordinary vehicle driving conditions require frequent periods of engine operation at low, idling speeds thereof, most of these accessory units are necessarily designed for operation at full capacity and/or optimum efficiency at low or idling engine speeds. Therefore, at all greater engine speeds in excess of idling speed, a progressively greater than necessary rotational input speed is transmitted from the engine crankshaft to these accessory units, whereby these units are caused to be operated at high levels of inefficiency, with attendant decreases in available motive engine horsepower and fuel economy, throughout the periods of operation of the vehicle at speeds other than idling speed. In addition to the aforementioned disadvantages of inefficiency, the varying rotational input speeds to these accessories create correspondingly varying physical and/or electrical strains thereon which initially requires special engineering of the accessories to withstand such strains and ultimately may contribute to or cause the premature failure of the accessories.

The foregoing shortcomings of conventional arrangements for powering vehicle accessory units are generally recognized in U.S. Pat. No. 3,958,419, wherein there is disclosed an apparatus for driving automobile accessory units at respective optimum constant speeds using an expansion engine powered by the flow of induction air to the main automobile engine. Conceptually, the invention described in this patent is considered to provide significant advantages over the conventional accessory driving arrangement described above, but the invention is not known to have achieved any reasonable degree of commercial recognition or success.

In contrast, the present invention provides an efficient hydraulic fluid power transmission of a relatively simple and operable construction adapted for receiving a variable speed rotary input force and transmitting a relatively substantially constant speed rotary output force, for use in conjunction with a vehicle engine for drivingly transmitting the varying crankshaft speed thereof at respective constant output speeds to equipment accessory thereto, as well as for use in widely varying other embodiments wherein it is desirable to provide a constant output speed from a varying input speed.

SUMMARY OF THE INVENTION

Briefly described, the fluid power transmission of the present invention includes a rotor arrangement adapted to be rotatably driven by the variable speed rotary input force in direct relation therewith, and a housing arrangement annularly mounted on the rotor arrangement for relative rotation thereabout, the housing arrangement sealably defining with the rotor arrangement a fluid drive circuit for being in driven relation therewith. The housing arrangement includes a fluid reservoir, an eccentric ring disposed annularly about the rotor arrangement for defining a fluid working chamber annularly therebetween, and fluid passageways respectively between the reservoir and the working chamber. A predetermined quantity of noncompressible hydraulic fluid is contained in the drive circuit and a valve assembly is disposed in one passageway and has a valve operating member movable generally radially of the housing arrangement. The valve operating member is biased into a normal radially-inward valve closing position to prevent fluid flow in the passageways for essentially hydraulically locking the rotor and housing arrangements in direct driving relation. The valve operating member is yieldable radially-outwardly variably in a predetermined direct responsive relation to centrifugal forces generated by rotation of the housing arrangement in excess of a predetermined optimum rotational speed thereof for permitting positive displacement rotor-impelled fluid flow through the passageways at varying flow rates directly related to the excess rotational speed of the housing arrangement for causing variable slippage between the rotor and housing arrangements in direct relation to the excess rotational speed of the housing arrangement. In this manner, increases in the rotational speed of the housing arrangement over the optimum speed thereof are substantially limited.

In the preferred embodiment, the rotor arrangement includes a circular rotor having a plurality of angularly outwardly extending slots spaced circumferentially thereabout and includes a plurality of pumping or roller members disposed in the slots to move centrifugally outwardly therein into engagement with the eccentric ring upon rotation of the rotor for generating fluid pressure in the working chamber and for transmitting rotational movement of the rotor arrangement to the housing arrangement. The valve assembly is preferably arranged for regulating the fluid pressure in direct relation to loading of the housing arrangement. The rotor slots are arranged at a predetermined angle relative to respective radii extending therethrough selectively to determine the rotational speed of the rotor at which centrifugally outward movement of the pumping members occurs. The valve assembly includes an arrangement for providing fluid communication between opposite sides of the valve operating member for equalized fluid pressure thereat such that the valve member is radially outwardly movable responsively only to centrifugal force of rotation of the housing arrangement. Preferably, the valve operating member is a valve spool slidably disposed in the passageway and having an axial bore therethrough for equalized fluid pressure, at each end of the valve spool, with a spring arrangement biasing the valve spool into its normal valve closing position. A pulley is affixed coaxially with the housing arrangement for rotation therewith for transmitting the rotation thereof for driving operation of other apparatus requiring a relatively substantially constant speed input force. The fluid power transmission is preferably embodied in combination with a driving engine and one or more driven units auxiliary thereto, the rotor being operatively connected to the engine to be rotatably driven thereby at varying input speeds and the housing arrangement being operatively connected by its pulley and appropriate belts or the like to the driven auxiliary unit or units for driving thereof at the relatively substantially constant output speed of the housing arrangement.

DESCRIPTION OF THE PREFERRED EMBODIMENT

Figure 1:
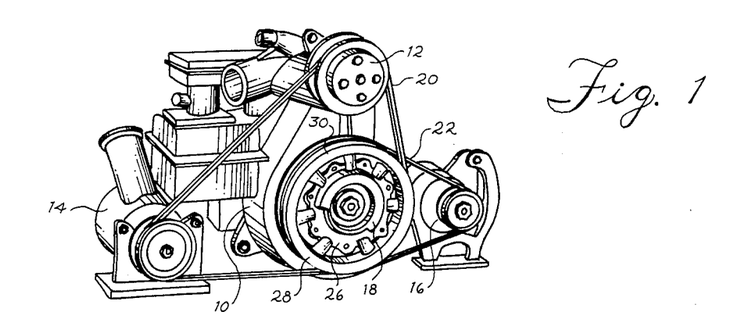
FIG. 1 is a perspective view of an internal combustion engine in combination with which the preferred embodiment of the fluid power transmission of the present invention is embodied for driving several auxiliary units.
Figure 2:
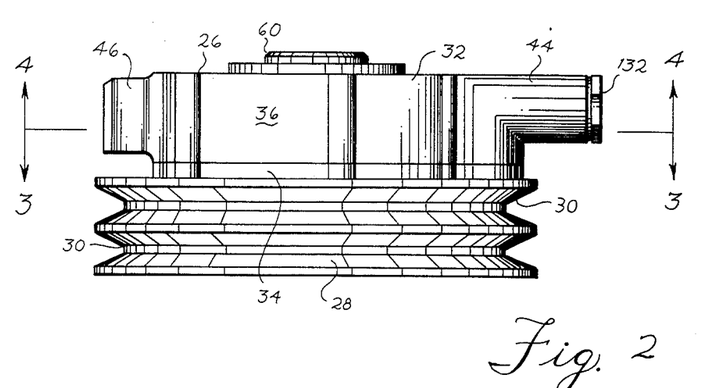
FIG. 2 is a side elevational view of the fluid power transmission of FIG. 1.

Referring now to the accompanying drawings and initially to FIG. 1, there is illustrated representatively a conventional internal combustion engine, indicated generally at 10, with which are drivenly associated several auxiliary driving units indicated representatively at 12, 14, and 16, which power various equipment (not shown) accessory to the engine 10. The illustrated auxiliary units include a water pump 12 for circulating cooling liquid through a radiator system (not shown) associated with the engine 10, a power steering pump 14 for supplying hydraulic fluid to a power steering unit (not shown), and an alternator 16 for generating electrical current to be supplied to various electrically-operated accessory items such as lights, a radio, and the like (not shown). However, it is to be understood that the illustrated auxilliary units 12, 14, 16 are representative and exemplary but not limiting on the present invention, a wide variety of other auxiliary units, e.g. an air conditioning compressor, one or more rotary fans, etc. (also not shown), being equally well adapted to be associated with the engine 10 for driving operation thereby. The engine 10 includes an internal crank arrangement (not shown) adapted in operation to rotate a driving crankshaft (not shown) by which the operational power output of the engine 10 is transmitted. As is conventional, the engine 10 includes a throttling arrangement (not shown) for regulating the flow of combustion fuel into the engine 10 whereby the engine 10 may be selectively operated at varying speeds to achieve varying rotational output speeds of its crankshaft.

The fluid power transmission of the present invention is indicated in FIG. 1, generally at 18 fixedly connected to the engine crankshaft to be driven thereby and associated with the auxiliary units 12, 14, 16 for driving thereof by endless drive belts 20, 22. Basically, the transmission 18 includes a rotor arrangement, indicated generally at 24 in FIGS. 3 and 4, fixedly connected with the engine crankshaft to be rotated thereby and a housing assembly, indicated at 26, annularly mounted on the rotor arrangement 24 for relative rotation thereabout in driven relation therewith. The housing assembly 26 includes a pulley wheel 28 having two annular belt guide tracks 30 in which the two belts 20, 22 are trained to be driven by the transmission 18.

The particular construction and operation of the fluid power transmission 18 will best be understood with reference to FIGS. 2-6. The housing assembly 26 includes two mating housing body members 32, 34 each preferably cast of an appropriate metallic material. The housing member 32 includes a generally cylindrical annular wall portion 36 with a radial wall portion 38 extending inwardly from one axially end of the annular wall portion 36 to cooperatively define a generally cylindrical interior area therewithin. The other axially end of the annular wall portion 36 is provided with a substantially flat annular radial face 40 in which are formed at spacings thereabout a plurality of threaded axial bores 42. A cylindrical portion 44 extends radially outwardly from the annular wall 36 and the annular wall 36 is provided with an enlarged outward portion 46 diametrically opposite the cylindrical portion 44 as a balancing counterweight thereto. The housing body member 34 is formed of a generally circular configuration corresponding to the peripheral shape of the annular wall portion 36 of the housing body member 32 and includes a flat radial face 48 at one side thereof and has a plurality of openings 50 axially formed therethrough about the periphery thereof at locations corresponding to the bores 42 of the housing body member 32. The housing body members 32, 34 are affixed with their respective flat face portions 40, 48 in sealing abutment, with the bores 42 and openings 50 aligned and with securing bolts 52 extending through the openings 50 of the body member 34 and secured threadedly in the bores 42 of the body member 32. The aforementioned pulley wheel 28 is fixed to the outward side of the housing body member 34 annularly thereabout, the housing body member 34 and the pulley wheel 28 preferably being cast as an integral unit. The housing body members 32, 34 also include respective central axial openings 54, 56 aligned and coaxial with the rotational axis of the housing assembly 26 in the assembled relation of the housing body members 32, 34, each opening 54, 56 being fitted with an annular sealing ring 58.

Figure 3:
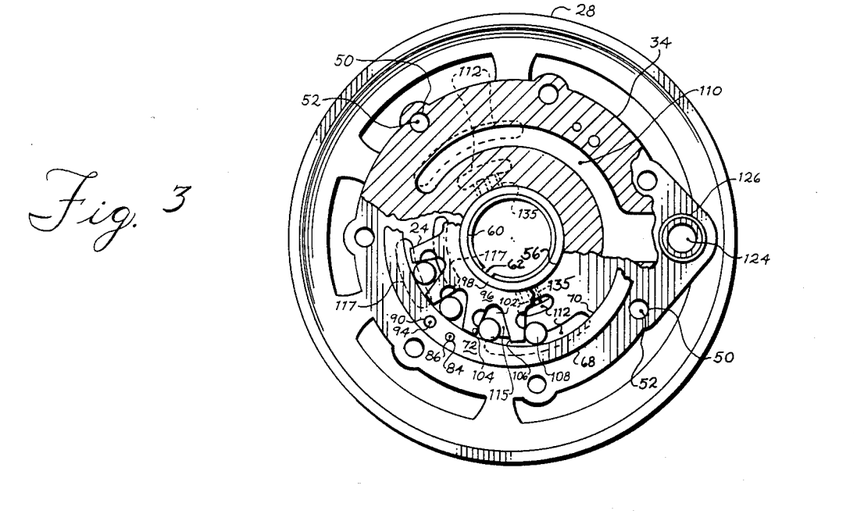
FIG. 3 is a partially broken-away vertical sectional view thereof taken along line 3—3 of FIG. 2.
Figure 4:
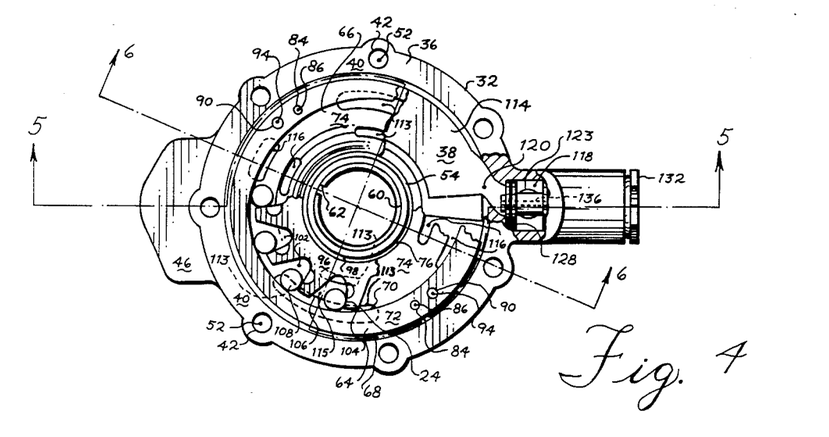
FIG. 4 is another partially broken-away vertical sectional view thereof taken along line 4—4 of FIG. 2.
Figure 5:
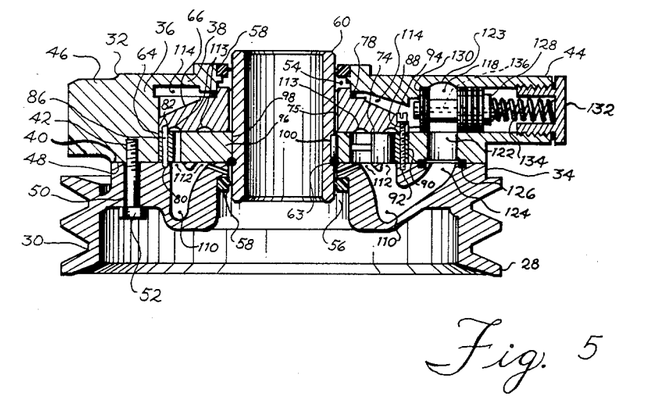
FIG. 5 is another vertical sectional view thereof taken along line 5—5 of FIG. 4.
Figure 6:
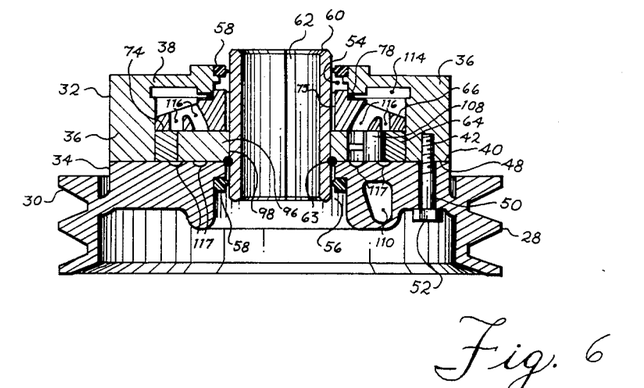
FIG. 6 is another vertical sectional view thereof taken along line 6—6 of FIG. 4.

Interiorly within the assembled housing members 32, 34, an annular ring member 64 and a pressure plate 66 are affixed to the radial face 48 of the housing body member 34 to define therewith an enclosure within which the rotor arrangement 24 is contained. The annular ring 64 has a substantially cylindrical exterior wall surface 68 and an eccentric elliptical interior wall surface 70 between which extend opposite flat annular radial surfaces 72. The annular ring 64 is disposed within the cylindrical interior area of the housing body member 32 with its exterior wall 68 snugly in abutment with the interior wall surface of the annular wall 36 and with one of its radial surfaces 72 in sealing abutment with the flat radial face 48 of the housing body member 34. The pressure plate 66 is formed of a generally circular configuration having a peripheral shape corresponding to the annular ring 64 and has a central circular opening 76 extending therethrough in which is fitted a sleeve bearing 75. One side of the pressure plate 66 is formed as a substantially flat radial face 74 the peripheral portion of which sealingly abuts the other radial surface 72 of the annular ring 64. The other side of the pressure plate 66 is configured taperingly outwardly toward its central opening 76 to cooperate with the interior surface of the radial wall portion 38 of the housing body member 32 to sealingly engage therebetween a sealing ring 78 annularly about the central opening 54 of the housing body member 32. A pair of circular depressions 80 are formed in the radial face 48 of the housing body member 34 at diametrically opposite locations of abutment with the annular ring 64, corresponding circular depressions 82 are formed in the radial face 74 of the pressure plate 66 at diametrically opposite locations adjacent its periphery, and corresponding openings 84 are formed axially through the annular ring 64 at diametrically opposite locations, the depressions 80, 82, and openings 84 being aligned and receiving therethrough pins 86 to properly position the annular ring 64 and pressure plate 66 in relation to the housing body member 34. A pair of openings 88 are formed axially through the pressure plate 66 respectively adjacent its depressions 82 and are aligned with another pair of openings 90 extending axially through the annular ring 64 respectively adjacent its openings 84 and in alignment with a pair of threaded bores 92 formed in the radial face 48 of the housing body member 34 respectively adjacent its depressions 80, a pair of bolts 94 extending through the openings 88, 90 and threadedly received in the bores 92 to fixedly secure the annular ring 64 and the pressure plate 66 in their described disposition. In such disposition, the central opening 76 of the pressure plate 66 is coaxially aligned with the aligned central openings 54, 56 of the housing body members 32, 34.

The rotor arrangement 24 includes a cylindrical stub shaft 60 which extends rotatably through the central openings 54, 56, 76 of the housing body members 32, 34, and the pressure plate 66 thereby rotatably supporting the housing assembly 26. A circular rotor member 96 is rotatably disposed in the enclosure defined by the radial face 48 of the housing body member 34, the interior wall 70 of the annular ring 64, and the radial face 74 of the pressure plate 66. The rotor member 96 includes a central opening 98 coaxially aligned with the central openings 54, 56, 76, and through which opening 98 the stub shaft 60 therefor extends. The stub shaft 60 includes an axially-extending slot 62 in its interior wall by which the shaft 60 is keyed to the engine crankshaft to be directly driven thereby and, in turn, the rotor member 96 is keyed at 100 at its central opening 98 to the stub shaft 60 in abutment against a retaining ring 63 thereon to be driven directly by the stub shaft 60 and the crankshaft. A plurality of slots 102 are formed in the periphery of the rotor member 96 at equal spacings thereabout, each such slot 102 being defined by diverging bearing surfaces 104, 106 respectively oriented at predetermined angles relative to a radius centrally through the slot 102. A cylindrical roller member 108 is disposed in each slot 102 axially parallel to the axis of the rotor member 96. As viewed in FIG. 3, the rotor member 96 is arranged to rotate in a counter-clockwise direction (clockwise in FIG. 4.)

A passageway arrangement is provided through the housing assembly 26 to define a fluid circuit adapted for fluid flow therethrough for controlling the relative rotation of the rotor arrangement 24 in the housing assembly 26. A reservoir chamber 110 is formed interiorly within the housing body member 34 partially annularly thereabout and opens to the rotor enclosure area through two pair of arcuate slots 112 formed in the radial face 48 of the housing body member 34 coaxially about its central opening 56 at diametrically opposite sides thereof. It is to be noted that in FIG. 3 the housing member 34 is shown partially broken away in section so that only one pair of the slots 112 actually appears, the other pair thereof being illustrated in broken lines for purposes of indicating their position above the partial section shown. Two pair of concentric arcuate recesses 113 are formed in the radial face 74 of the pressure plate 66 directly opposite the arcuate slots 112 for hydraulic balancing of fluid flow therethrough. The elliptical shape of the interior wall 70 of the annular ring 64 forms two enlarged areas 115 between the ring 64 and the rotor member 96 at diametrically-opposite locations which provide fluid working areas as hereinafter described. The annular spacing between the interior wall surface of the radial wall portion 38 of the housing body member 32 and the tapered surface of the pressure plate 66 forms a secondary chamber 114 which also opens to the rotor member enclosure area through two pair of arcuate slots 116 formed through the pressure plate 66 coaxially about its central opening 76 at diametrically opposite sides thereof at approximately 90 degree spacings from the two pair of slots 112 relative to the stub shaft 60. Two pair of concentric arcuate recesses 117 are formed in the radial face 48 of the housing body member 34 directly opposite the arcuate slots 116 for hydraulic balancing of fluid flow therethrough. The cylindricl portion 44 of the housing body member 32 has a cylindrical passageway 118 formed substantially entirely therethrough radially relative to the stub shaft 60, which passageway 118 communicates with the secondary chamber 114 through a passageway 120 which extends angularly therebetween. A cylindrical passageway 122 extends perpendicularly from the passageway 118 axially through the annular wall portion 36 of the housing body member 32 and opens to the annular radial surface 40 thereof. A connecting passageway 124 extends through the housing body member 34 from its reservoir chamber 110 and opens to the radial face 48 thereof in alignment with the passageway 122, a sealing ring 126 being fitted in the face 48 about the opening of the passageway 124 to seal the connection thereof with the passageway 122. The cylindrical passageway 118 has received slidably therein a spool valve member 128, the passageway 118 forming a shoulder 130 annularly about the passageway 120 at the location of communication therebetween which shoulder 130 forms a seat for the spool valve member 128. The outward end of the cylindrical portion 44 of the housing body member 32 is internally threaded in its passageway 118 and threadedly receives a cap member 132 to close the passageway 118, a coil spring 134 being disposed in the outward end of the passageway 118 between the cap member 132 and the outward end of the spool valve member 128 to bias the spool valve member 128 into seated engagement with the shoulder 130 to close the communication between the passageways 118, 120. A predetermined quantity of an appropriate non-compressible hydraulic fluid, e.g. conventional automotive automatic transmission fluid, is contained in the fluid circuit formed by the described chambers and passageways. A conical recess 123 is formed in the wall surface of the passageway 118 directly opposite and in axial alignment with the passageway 122 for providing radial hydraulic balancing of the spool valve member 128. The spool valve member 128 includes a bore 136 extending axially therethrough to provide equalized fluid pressure in the fluid circuit at each end of the spool valve member 128 for axial hydraulic balancing of the valve spool member 128. Several small relief bores 135 extend from the reservoir chamber 110 at its arcuate slots 112 to the area of the sealing ring 58 at the central opening 56 of the housing body member 34 to prevent blow out of the sealing ring 58.

According to the operational concept of the present invetion, the transmission 18 is adapted to variably transmit the rotational speed of the engine crankshaft and the rotor arrangement 24 to the housing assembly 26 such that, as the rotor arrangement 24 is rotated at varying speeds by the crankshaft, the housing assembly 26 is rotated at substantially no greater than a predetermined optimum maximum speed for driving in turn the auxiliary units 12,14,16 at no greater than respective optimum speeds to be operated at their maximum respective efficiencies. For this purpose, the spring 134 is of a selected strength to urge the spool valve member 128 into its seated closed position at all rotational speeds of the housing assembly 26 at and under the predetermined optimum maximum speed thereof but to yield progressively under centrifugal forces created by rotation of the housing assembly 26 at speeds in excess of the predetermined optimum maximum speed to permit rotor-impelled fluid flow in the fluid circuit for relative movement of the housing assembly 26 about the rotor arrangement 24 while maintaining sufficient fluid pressure in the fluid circuit to maintain sufficient transmission of the rotation of the rotor arrangement 24 to the housing assembly 26 to maintain the predetermined optimum maximum speed thereof. Preferably, the predetermined optimum maximum speed will be the idling speed of the engine 10 or a relatively low speed only slightly greater than the idling speed, since most accessory equipment to automobile or like engines is designed to operate at its maximum efficiency at or near the engine idling speed, as hereinafter indicated. Throughout the operation of the arrangement of of the spool valve member 128 and the spring 134, the axial bore 136 through the spool valve member 128 permits the internal fluid pressure in the fluid circuit to remain substantially equalized on both ends of the spool valve member 128. Therefore, the radially outward movement of the spool valve member 128 is substantially only affected by the centrifugal forces created by rotation of the housing assembly 26 and the radially inward movement of the spool valve member 128 is substantially only affected by the biasing force of the spring 134, and particularly such movements are not affected by the rate of fluid flow through the valve ported area nor by the internal fluid pressure in the fluid circuit.

The operation of the fluid power transmission 18 will thus be understood. During the start-up of the engine 10 and at all rotational output speeds of its crankshaft and in turn of the rotor arrangement 24 up to and at the predetermined optimum maximum speed of the housing assembly 26, the spring 134 acts to maintain the spool valve member 128 seated on the shoulder 130 in its closed position thereby blocking the aforedescribed fluid circuit to prevent the flow of the hydraulic fluid therethrough. The rotor arrangement 24 and the housing assembly 26 are thereby essentially hydraulically locked relative to one another in a one-to-one driving relation for rotation in direct correspondence with each other at substantially equal rotational speeds. When the rotational speed of the engine exceeds the predetermined optimum maximum speed, the increased rotational speed of the rotor arrangement 24 will be momentarily transmitted to the housing assembly 26 creating increased centrifugal force therein which effects an instantaneous radially outward opening movement of the spool valve member 128 against the biasing force of the spring 134 thereby opening the previously closed fluid circuit. As will be understood, the centrifugal force of rotation of the rotor member 96 also effects an outward movement of the roller members 108 of the rotor arrangement along the bearing surfaces 104 of the slots 102 of the rotor member 96. The continuing rotation of the rotor member 96 with the engine crankshaft causes the rollers 108 to be moved relative to the annular ring 64 in an eccentric path following the eccentric interior wall 70 of the annular ring 64 whereby the rollers 108 reciprocably move inwardly and outwardly within their slots 102 along their bearing surfaces 104. This inward and outward movement of the rollers 108 creates a positive-displacement fluid pumping action by trapping and conveying fluid between adjacent rollers in the working areas 115 between the rotor member 96 and the radially enlarged areas defined by the elliptical annular ring 64 with the trapped fluid being forced from the working chamber 115 through the arcuate slots 116 in the pressure plate 66 at the locations in the direction of movement of the rotor member 96 at which the rollers 108 move inwardly of their slots 102 in following engagement of the interior wall 70 of the annular ring 64, while drawing fluid into the working areas 115 through the arcuate slots 112 in the radial face 48 of the housing body member 34 at the locations in the direction of rotation of the rotor member 96 at which the rollers 108 begin to move outwardly within their slots 102. As will be understood, this pumping action creates a closed circuit flow of the hydraulic fluid from the working area 115 progressively through the secondary chamber 114, the passageways 120, 118, 122, 124, the reservoir 110, and again into the working areas 115.

In this manner, the housing assembly 26 is permitted to rotate about the rotor arrangement 24 by slippage in direct relation to the degree of centrifugal movement of the valve spool 128 and to the directly related rate of fluid flow permitted in the fluid circuit, whereby essentially no, or a substantially limited, increase in the rotational speed of the housing assembly 26 is transmitted thereto by the increased rotational speed of the rotor arrangement 24. As the rotational speed of the engine crankshaft and of the rotor arrangement 24 further increases, there again occurs a momentary transmission of the increased rotational speed to the housing assembly 26 causing additional centrifugal force on the spool valve member 128 to move it further radially outwardly against the spring 134 permitting the pumping action of the rotor member 96 and its rollers 108 to effect a greater rate of fluid flow at substantially the same internal fluid pressure in the fluid circuit for producing increased slippage of the housing assembly 26 about the rotor arrangement 24 creating an increased speed differential therebetween to further substantially limit any increase in the rotational speed of the housing assembly 26. Upon a decrease in the rotational speed of the engine crankshaft and of the rotor arrangement 24 but still in excess of the predetermined optimum maximum speed of the housing assembly 26, the reduced speed of rotation of the rotor member 96 effects a reduction in the rate of fluid flow in the fluid circuit under the aforedescribed pumping action which causes a slight reduction in the rotational speed of the housing assembly 26 reducing the centrifugal force thereof applied to the spool valve member 128 sufficient to permit a slight radially inward movement of the spool valve member 128 while maintaining it radially outward of its seat 130 for continued fluid pumping action at substantially the same internal fluid pressure in the fluid circuit, thereby to maintain the rotational speed of the housing assembly 26 substantially constant at or only slightly above the predetermined optimum maximum speed. Upon a decrease in the rotational speed of the engine crankshaft and of the rotor arrangement 24 below the predetermined optimum maximum speed, the decreased rotational speed of the rotor member 96 will effect a more significant reduction in the rate of fluid flow in the fluid circuit under the pumping action of the rotor member 96 which causes reduction of the rotational speed of the housing assembly 26 sufficient to reduce the centrifugal force applied to the spool valve member 128 sufficiently to enable the spring 134 to overcome such centrifugal force and close the spool valve member 128 into engagement with its seat 130 to prevent further fluid flow and to return the housing assembly 26 into a direct hydraulically locked relation with the rotor arrangement 24. Thus, it will be understood that no fluid flow in the fluid circuit occurs at rotational speeds of the rotor member 96 less than or equal to the predetermined optimum speed. At rotational speeds of the rotor member 96 in excess of the optimum speed, the amount of slippage and the resulting speed differential between the rotor member 96 and the housing assembly 26 are directly proportional to the rate of fluid flow through the valve ported area.

As will be understood, changes in the load imposed on the pulley wheel 28 of the housing assembly 26 by the accessory equipment or otherwise during operation of the transmission 18 similarly affect the operation of the spool valve member 128. However, due to the tendency of the crankshaft and rotor arrangement 24 to continue rotation at their same speed, changes in the loading of the pulley wheel 28 affect not only the centrifugal movement of the spool valve member 128 but also affect the internal fluid pressure in the fluid circuit. Thus, an increase in the loading of the pulley wheel 28 result in a momentary corresponding slight reduction of the rotational speed thereof and of the centrifugal force generated thereby, causing a corresponding slight inward movement of the spool valve member 128 accompanied by an increase in the internal fluid pressure in the fluid circuit, thereby sufficiently compensating for and carrying the additional load with little change or only a slight decrease in the speed of the pulley wheel 28. Conversely, decreases in the loading of the pulley wheel 28 result in a corresponding momentary increase in the rotational speed thereof and the centrifugal force generated, causing a compensating slight radial outward movement of the spool valve member 128 accompanied by a slight decrease in the internal fluid pressure in the fluid circuit, thereby compensating for the decreased load with little change in or only a slight decrease in the rotational speed of the pulley wheel 28. Thus, it will be understood that the internal pressure in the fluid circuit during operation is constantly in direct proportion to the load placed upon the pulley member 28 of the housing assembly 26.

It will be understood that during operation, rotation of the rotor member 96 will result in centrifugally outward movement of the rollers 108, all as more fully described below. As desired, the rotor member 96 may be constructed with its slots 102 selectively inclined to a predetermined degree relative to respective radii therethrough either in the direction of rotation of the rotor member 96 or away therefrom or selectively not inclined so as to determine the speed of rotation of the rotor member 96 at which the rollers 108 move centrifugally outwardly in their slots 102. As will be understood, inclination of the slots 102 in the direction opposite the direction of rotor rotation encourages outward movement of the rollers 108 at relatively slower speeds of rotor rotation while inclination of the slots 102 in the direction of rotor rotation discourages outward movement of the rollers 108 until relatively greater speeds of rotor rotation. The selection of the degree of inclination of the slots 102 determines the particular rotational speed at which outward roller movement occurs. As used herein, inclination of the slots 102 is determined by the inclination of the trailing bearing surfaces 104 thereof. It is contemplated that it will be preferable in motor vehicle embodiments of the present invention to employ rotors having slots inclined opposite the direction of rotor rotation to discourage outward roller movement until a crankshaft and rotor speed slightly below the desired optimum speed so that during starting of the engine the auxiliary units do not create undesired drag on the engine starting system.

Figure 7:
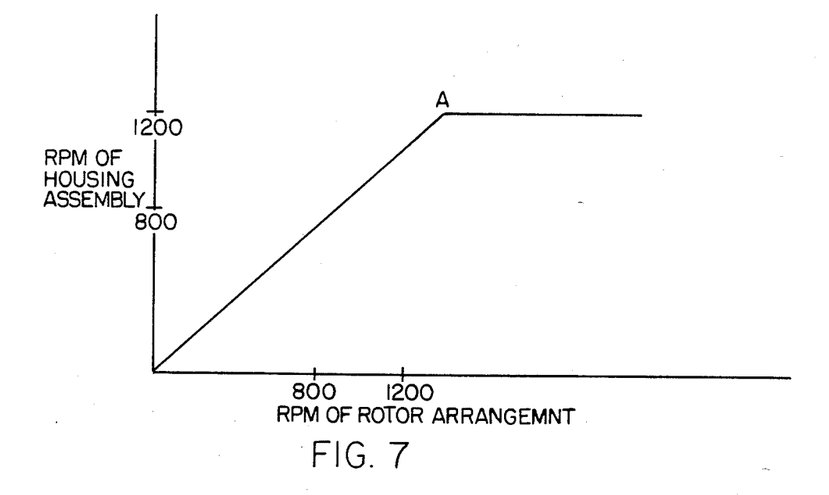
FIG. 7 is a graph illustrating the operation of the fluid power transmission of the present invention.

Illustrated in FIG. 7 is a graph representatively plotting the rotational speed of the rotor arrangement 24 against the rotational speed of the housing assembly 26 to illustrate the aforedescribed operation of the fluid power transmission 18.

In the graph of FIG. 7, the predetermined optimum maximum speed of rotation of the housing assembly 26 is indicated at point A which is slightly greater than the normal idling rotational speed of the rotor arrangement 24 and the engine crankshaft. In a normal conventional motor vehicle embodiment, the engine idling speed would be in the range of approximately 800 revolutions per minute of the engine crankshaft and, in turn, of the rotor arrangement 24 with the engine speed being adapted to be increased to several thousand revolutions per minute. In such an embodiment, the optimum rotational speed of the housing assembly 26 would preferably be in the range of approximately 1200 revolutions per minute. As will thus be understood, during engine startup (i.e. engine crankshaft speeds between 0 and idling) and under load-bearing operating conditions of the engine less than and equal to the predetermined optimum maximum speed A of the housing assembly 26, the valve spool member 128 will be closed to hydraulically lock the housing assembly 26 and the rotor arrangement 24 in a one-to-one driving relationship to be driven by the engine crankshaft essentially as an integral unit. This operating range of the transmission 18 is representatively indicated in the graph of FIG. 7 by the illustrated line between the graph origin and point A which is oriented at a 45° angle to represent the described direct driving relationship between the rotor arrangement 24 and the housing assembly 26. As also previously described, at rotational speeds of the rotor arrangement 24 in excess of the predetermined optimum housing speed A, the valve spool member 128 will yield to permit slippage of the housing assembly 26 about the rotor arrangement 24 to restrict the transmission of the increased rotor speed to the housing assembly 26. Accordingly, at rotational speeds of the rotor arrangement 24 above the predetermined optimum maximum rotational speed of the housing assembly 26, the rotational speed of the housing assembly 26 will vary slightly within a small range represented in the graph of FIG. 7 by the relatively flat line portion extending outwardly from point A. It is preferred that the cross-sectional area of the valve port opening at the valve seat 130 be relatively large in relation to the fluid pumping capacity of the rotor arrangement 24 so as to provide a relatively greater valve ported area for greater fluid flow rates for any given degree of yielding movement of the valve spool member 128. By selective determination of such valve seat opening, the magnitude of increases in the rotational speed of the housing assembly 26 proportionately to increases in the rotational speed of the rotor arrangement 24 may be limited so that the slope of the portion of the graph of FIG. 7 outwardly from point A may be maintained relatively flat. During operation of the transmission 18, increases and decreases in the rotational speed of the rotor arrangement 24 and, in turn, of the housing assembly 26 will vary generally along the illustrated lines in the above graph. However, as will be understood, the actual operation of the transmission 18 will not produce an exact linear relationship between the rotational speeds of the rotor arrangement 24 and the housing assembly 26 due to ordinary fluctuations and momentary delays of response of the housing assembly 26 to the rotor arrangement 24 and also due to other parameters such as increases and decreases in the loading of the housing assembly 26 by the driven auxiliary units or otherwise. Accordingly, the graph of FIG. 7 should be understood to be only exemplary and illustrative of the basic manner of operation of the transmission 18.

The advantages of the fluid power transmission 18 will thus be understood. Predominantly, the transmission 18 enables the varying rotational output of most conventional driving engines to be transmitted at a substantially constant predetermined output speed or within a relatively small range of output speeds having a predetermined optimum maximum speed such that, by appropriate belt, gear or other driving arrangements, each item of auxiliary or other driven equipment can be operated at a predetermined constant speed or within a predetermined range of speeds generally at its optimum efficiency. Resultingly, less load will be placed on the engine at its operating speeds above the predetermined output speed of the transmission in comparison to conventional auxiliary-driving arrangements, permitting a greater amount of available horsepower to be supplied to the primary driving operation of the engine with correspondingly better fuel economy being achieved. Since the auxiliary equipment will not be subjected to widely varying physical and electrical strains typically encountered in conventional arrangements, the auxiliary units ordinarily may be constructed smaller and less costly than conventionally required while nevertheless providing a comparable or longer expected useful life. The present transmission is particularly adapted to be embodied in combination with a conventional motor vehicle engine for driving the normal accessory units thereto and, since the driving arrangements utilized in motor vehicle engines for driving auxiliary equipment are conventionally designed to power the equipment at its optimum efficiency at or slightly above the normal engine idling speed, the use of the present transmission in motor vehicle embodiments will not require any special engineering changes in the motor vehicle engine itself.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. A fluid power transmission adapted for receiving a variable speed rotary input force and transmitting a relatively substantially constant speed rotary output force, said transmission comprising:
   (a) rotor means adapted to be rotatably driven by said input force in direct variable speed relation therewith,
   (b) housing means annularly mounted on said rotor means for relative rotation thereabout and having means sealably defining with said rotor means a fluid drive circuit for being in driven relation therewith, said drive circuit defining means including eccentric ring means disposed annularly about said rotor means for defining a fluid working chamber annularly therebetween, a fluid reservoir in said housing means, and fluid passageway means in said housing means for fluid flow respectively between said reservoir and said working chamber,
   (c) a predetermined quantity of non-compressible hydraulic fluid contained in said drive circuit, and
   (d) valve means disposed in said passageway means and having a valve operating member movable generally radially of said housing means, said valve operating member being biased into a normal radially-inward valve closing position to prevent fluid flow in said passageway means for essentially locking said rotor means and said housing means in direct driving relation, and being yieldable radially-outwardly variably in a predetermined direct responsive relation to centrifugal forces generated by rotation of said housing means in excess of a predetermined optimum rotational speed thereof for permitting positive displacement rotor means-impelled fluid flow through said passageway means at varying flow rates directly related to said excess rotational speed of said housing means for causing variable slippage between said rotor means and said housing means in direct relation to said excess rotational speed of said housing means, thereby substantially limiting increases in the rotational speed of said housing means over said optimum speed thereof.

2. A fluid power transmission according to claim 1 and characterized further by driven means operatively associated with said housing means for transmitting the rotation thereof for driving operation of other apparatus requiring a relatively substantially constant speed input force.

3. A fluid power transmission according to claim 2 and characterized further in that said driven means includes pulley means affixed coaxially with said housing means for rotation therewith.

4. A fluid power transmission according to claim 1 and characterized further in that said rotor means includes a circular rotor having a plurality of angularly outwardly extending slots spaced circumferentially thereabout and includes a plurality of pumping members disposed in said slots for movement outwardly therein into engagement with said ring means upon rotation of said rotor for generating fluid pressure in said working chamber and for transmitting rotational movement to said housing means.

5. A fluid power transmission according to claim 4 and characterized further in that said valve means is arranged biasingly for regulating said fluid pressure in direct relation to loading of said housing means.

6. A fluid power transmission according to claim 4 and characterized further in that said slots are arranged at a predetermined angle relative to respective radii therethrough selectively to determine the rotational speed of said rotor at which centrifugally outward movement of said fluid pumping members occurs.

7. A fluid power transmission according to claim 1 and characterized further in that said valve operating member comprises a valve spool slidably disposed in said passageway means and spring means biasing said valve spool into said normal valve closing position.

8. A fluid power transmission according to claim 1 and characterized further in that said valve means includes means for providing fluid communication between opposite sides of said valve operating member for equalized fluid pressure thereat for radially outward movement of said valve member responsively only to said centrifugal force of rotation of said housing means.

9. A fluid power transmission according to claim 8 and characterized further in that said fluid communication means includes a bore extending through said valve operating member.

10. A fluid power transmission according to claim 9 and characterized further in that said valve operating member comprises a valve spool slidably disposed in said passageway means and said bore extrends axially through said valve spool.

11. A fluid power transmission according to claim 8 and characterized further in that said rotor means includes a circular rotor having a plurality of angularly outwardly extending slots spaced circumferentially thereabout and includes a plurality of roller members disposed in said slots for movement outwardly therein into engagement with said ring means upon rotation of said rotor for generating fluid pressure in said working chamber and for transmitting rotational movement to said housing means.

12. A fluid power transmission according to claim 11 and characterized further by driven means operatively associated with said housing means for transmitting the rotation thereof for driving operation of other apparatus requiring a relatively substantially constant speed input force.

13. A fluid power transmission according to claim 12 and characterized further in that said valve operating member comprises a valve spool having an axial bore therethrough for equalized fluid pressure at each end of said valve spool to be radially outwardly movable responsively only to said centrifugal force of rotation of said housing means.

14. A fluid power transmission according to claim 13 and characterized further in that said valve means is arranged biasingly for regulating said fluid pressure in direct relation to loading of said housing means.

15. A fluid power transmission according to claim 14 and characterized further in that said driven means includes pulley means affixed coaxially with said housing means for rotation therewith.

16. A fluid power transmission according to claim 14 and characterized further in that said slots are arranged at a predetermined angle relative to respective radii therethrough selectively to determine the rotational speed of said rotor at which centrifugally outward movement of said rollermembers occurs.

17. In combination with a driving engine and a driven unit auxiliary thereto, a fluid power transmission drivenly associated with said engine and drivingly associated with said auxiliary unit for receiving a variable speed rotary input driving force from said engine and transmitting a relatively substantially constant speed rotary output driving force to said auxiliary unit, said fluid power transmission comprising:
  (a) rotor means operatively connected to said engine to be rotatably driven by said input force thereof in direct variable speed relation therewith,
  (b) housing means annularly mounted on said rotor means for relative rotation thereabout and having means sealably defining with said rotor means a fluid drive circuit for being in driven relation therewith, said housing means being operatively connected to said auxiliary unit for driving thereof by said output force at said constant speed, said drive circuit defining means including eccentric ring means disposed annularly about said rotor means for defining a fluid working chamber annularly therebetween, a fluid reservoir in said housing means, and fluid passageway means in said housing means for fluid flow respectively between said reservoir and said working chamber,
  (c) a predetermined quantity of non-compressible hydraulic fluid contained in said drive circuit, and
  (d) valve means disposed in said passageway means and having a valve operating member movable generally radially of said housing means, said valve operating member being biased into a normal radially-inward valve closing position to prevent fluid flow in said passageway means for essentially locking said rotor means and said housing means in direct driving relation, and being yieldable radially-outwardly variably in a predetermined direct responsive relation to centrifugal forces generated by rotation of said housing means in excess of a predetermined optimum rotational speed thereof for permitting positive displacement rotor means impelled fluid flow through said passageway means at varying flow rates directly related to said excess rotational speed of said housing means for causing variable slippage between said rotor means and said housing means in direct relation to said excess rotational speed of said housing means, thereby substantially limiting increases in the rotational speed of said housing means over said optimum speed thereof.

18. The combination of claim 17 and characterized further by driven means operatively associated with said housing means for transmitting the rotation thereof for driving operation of said auxiliary unit.

19. A fluid power transmission according to claim 17 and characterized further in that said rotor means includes a circular rotor having a plurality of angularly outwardly extending slots spaced circumferentially thereabout and includes a plurality of pumping members disposed in said slots for movement outwardly therein into engagement with said ring means upon rotation of said rotor for generating fluid pressure in said working chamber and for transmitting rotational movement to said housing means.

20. A fluid power transmission according to claim 19 and characterized further in that said valve means is arranged biasingly for regulating said fluid pressure in direct relation to loading of said housing means.

21. A fluid power transmission according to claim 17 and characterized further in that said valve operating member comprises a valve spool slidably disposed in said passageway means and spring means biasing said valve spool into said normal valve closing position.

22. A fluid power transmission according to claim 17 and characterized further in that said valve means includes means for providing fluid communication between opposite sides of said valve operating member for equalized fluid pressure at said opposite sides for radially outward movement of said valve operating member responsively only to said centrifugal force of rotation of said housing means.

23. A fluid power transmission according to claim 22 and characterized further in that said rotor means includes a circular rotor having a plurality of angularly outwardly extending slots spaced circumferentially thereabout and includes a plurality of roller members disposed in said slots for movement centrifugally outwardly therein into engagement with said ring means upon rotation of said rotor for generating fluid pressure in said working chamber and for transmitting rotational movement to said housing means.

24. The combination of claim 23 and characterized further by driven means operatively associated with said housing means for transmitting the rotation thereof for driving operation of said auxiliary unit.

25. A fluid power transmission according to claim 24 and characterized further in that said valve operating member includes a valve spool slidably disposed in said passageway means and spring means biasing said valve spool into said normal closed position.

26. A fluid power transmission according to claim 25 and characterized further in that said valve spool includes an axial bore therethrough for equalized fluid pressure at each end of said valve to be radially outwardly movable responsively only to said centrifugal force of rotation of said housing means.

27. A fluid power transmission according to claim 26 and characterized further in that said valve means is arranged biasingly for regulating said fluid pressure in direct relation to loading of said housing means.

28. A fluid power transmission according to claim 27 and characterized further in that said driven means includes pulley means coaxially with said housing means for rotation therewith.

29. A fluid power transmission according to claim 28 and characterized further in that said slots are arranged at a predetermined angle relative to respective radii therethrough selectively to determine the rotatinal speed of said rotor at which centrifugally outward movement of said rollers occurs.

* * * * *

UNITED STATES PATENT OFFICE
CERTIFICATE OF CORRECTION

Patent No. 4,541,513     Dated September 17, 1985

Inventor(s) William H. Payne

It is certified that error appears in the above-identified patent and that said Letters Patent are hereby corrected as shown below:

Column 6, Line 28, delete "cylindricl" and insert therefor -- cylindrical --.
Column 7, Line 8, delete "invetion" and insert therefor -- invention -- .
Column 7, Line 37, delete "hereinafter" and insert therefor -- hereinbefore -- .
Column 11, Line 19, delete "above" and after "graph" insert -- of Fig. 7. --
Column 13, Line 63, delete "14" and insert therefor -- 15 --.
Column 16, Line 20, after "means" insert -- affixed --.
Column 16, Line 25, delete "rotatin" and insert therefor -- rotational --.

Signed and Sealed this

*Eighteenth* Day of *February 1986*

[SEAL]

*Attest:*

*Attesting Officer*

DONALD J. QUIGG

*Commissioner of Patents and Trademarks*